United States Patent
Tsai

(10) Patent No.: US 6,535,111 B2
(45) Date of Patent: Mar. 18, 2003

(54) WAVE-DISCRIMINATING INDUCTIVE ELECTRONIC DEVICE

(76) Inventor: Ching-Tien Tsai, No. 6, Kwang Fu Road, Erh-Lin City, Chang-Hua Hsien (TW)

( * ) Notice: Subject to any disclaimer, the term of this patent is extended or adjusted under 35 U.S.C. 154(b) by 0 days.

(21) Appl. No.: 09/917,416

(22) Filed: Jul. 26, 2001

(65) Prior Publication Data

US 2003/0020608 A1 Jan. 30, 2003

(51) Int. Cl.[7] .............................................. G08B 27/00
(52) U.S. Cl. .................. 340/326; 340/331; 340/815.45; 381/83; 381/93; 455/458; 455/567
(58) Field of Search ................................. 340/326, 327, 340/328, 329, 330, 331, 332, 333, 815.45, 815.71; 455/41, 458, 567; 381/83, 93; 379/372

(56) References Cited

U.S. PATENT DOCUMENTS

| | | | | |
|---|---|---|---|---|
| 4,984,296 A | * | 1/1991 | Schotz | 455/193 |
| 5,233,649 A | * | 8/1993 | Guerra, Jr. | 379/312 |
| 5,493,603 A | * | 2/1996 | Hirayama | 379/58 |
| 5,852,610 A | * | 12/1998 | Olaniyan | 370/486 |
| 6,032,031 A | * | 2/2000 | Takaki | 455/245.2 |
| 6,064,893 A | * | 5/2000 | O'Brien | 455/569 |
| 6,184,651 B1 | * | 2/2001 | Fernandez et al. | 320/108 |
| 6,275,690 B1 | * | 8/2001 | Higuchi et al. | 455/412 |

* cited by examiner

*Primary Examiner*—Daniel J. Wu
*Assistant Examiner*—Daniel Previl
(74) *Attorney, Agent, or Firm*—W. Wayne Liauh

(57) ABSTRACT

A wave-discriminating inductive electronic device includes a special integrated circuit that is inducible by a proximity feeble electromagnetic signal generated by a general mobile phone during receiving and transmitting signals, so that the induced integrated circuit is able to control and drive another integrated circuit that includes voice and motor driving circuits. Voices and vibrations produced by the integrated circuit enable the wave-discriminating inductive electronic device to provide a highly interesting entertaining effect.

7 Claims, 3 Drawing Sheets

WAVE-DISCRIMINATING INDUCTIVE ELECTRONIC DEVICE

FIELD OF THE INVENTION

The present invention relates to a specially designed integrated circuit that is able to control and drive another integrated circuit that include voice and motor driving circuits, so as to create desired entertaining effect.

BACKGROUND OF THE INVENTION

With the highly developed communication technologies, radio communication apparatus, such as pagers, mobile phones, etc., are no longer expensive products and have become very popular among businessmen, general office workers, housewives, students, and even people living in countryside. These radio communication products fully prove the conveniences brought by the high technologies to people in their daily life.

The mobile phone becomes increasingly important in the modern society due to its convenience and practicality. While people are enjoying the convenience and efficiency brought to them by the mobile phone, there are still demands for the mobile phone to provide an entertaining effect in addition to its communication function. Inductive electronic products are therefore developed to make the mobile phone versatile in functions and more interesting for use.

Most conventional inductive electronic products for such purpose include only a signal receiver for receiving a signal input. The received signal input is then amplified by an amplifier and sent to a driving circuit, so that related driving elements connected to the driving circuit are driven to act and thereby produce entertaining effect. FIG. 1 is a block diagram showing the structure of a conventional inductive electronic device for the above-described purpose. As shown, the conventional inductive electronic device includes an electronic inductive driving circuit 1 that includes a signal induction receiver 12 for inducing and receiving an externally transmitted signal input 11, an amplifier circuit 13 connected to the signal induction receiver 12 for appropriately amplifying an analogue signal received from the signal induction receiver 12.

The amplifier circuit 13 completes the signal amplification and then outputs an amplified signal to a driving circuit 14. The driving circuit 14 drives a servo motor 15, a light-emitting diode 17, and a speaker 18 connected thereto, so that these servo motor 15, light-emitting diode 17 and speaker 18 react appropriately in response to received driving signals to create desired entertaining effect. The electronic inductive driving circuit 1 also includes a driving power source 16 for providing power needed by the electronic inductive driving circuit 1 to work.

From the above description, it is known that the conventional electronic inductive driving circuit 1 provided on a mobile phone to create entertaining effect is only a signal inducing and amplifying element having a plurality of sound and light producing elements connected thereto. Such conventional electronic inductive driving circuit 1 has not the detection function and is not able to determine whether the signal input 11 is an electromagnetic wave or an interfering wave. Without the detection function, the conventional electronic inductive driving circuit 1 tends to drive driving elements to act even when the received signal input is an unwanted interfering signal, and therefore frequently produces wrong and undesired response to the signal input.

It is therefore desirable to improve the conventional electronic inductive driving circuit so that it is wave discriminating to perform its function in a more accurate manner.

SUMMARY OF THE INVENTION

According to one aspect of the present invention, there is provided a wave-discriminating inductive electronic device that incorporates a detector diode and other elements to screen out unwanted signals, so that an electronic inductive element mounted on a mobile phone enables the mobile phone to provide an optimal entertaining effect without producing wrong and unwanted reactions.

According to another aspect of the present invention, there is provided a wave-discriminating inductive electronic device for mounting on a mobile phone. The device includes a signal induction receiver for receiving an external signal, a signal amplifier for receiving and amplifying the received external signal, a detector diode for filtering the amplified signal to remove unwanted noises and obtain an optimal signal, and a driving circuit for using the optimal signal to drive a plurality of driving elements connected thereto to produce sound and light and thereby creates an entertaining effect.

The driving circuit of the present invention is preferably connected to a plurality of light-emitting diodes, whereby when the inductive electronic device of the present invention receives and processes a desired signal, the light-emitting diodes are driven to emit light.

The driving circuit of the present invention is preferably connected to a plurality of servo motors, whereby when the inductive electronic device of the present invention receives and processes a desired signal, the servo motors are driven to react appropriately and produce vibrations or other reminding acts.

The driving circuit of the present invention is preferably connected to a plurality of voice means, whereby when the inductive electronic device of the present invention receives and processes a desired signal, the voice means are driven to produce sounds or other reminding acts.

It is preferable that the detector diode in the inductive electronic device of the present invention may be alternatively provided in front of the signal induction receiver to detect the external signal before the same is received by the signal induction receiver.

It is also preferable the detector diode in the inductive electronic device of the present invention may be alternatively provided between the signal induction receiver and the signal amplifier to detect a signal sent by the signal induction receiver and then sends the detected signal to the signal amplifier for signal amplification.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention relates to a wave-discriminating inductive electronic device that is a consumptive product providing good entertaining effect, and more particularly to a wave-discriminating inductive electronic device that could be induced by a proximity feeble electromagnetic wave produced by a mobile phone or a radio communication apparatus during receiving or transmitting a signal, so as to generate changeful sounds and light beams and thereby increases the entertaining effect provided by the mobile phone or the radio communication apparatus.

Figure 1:
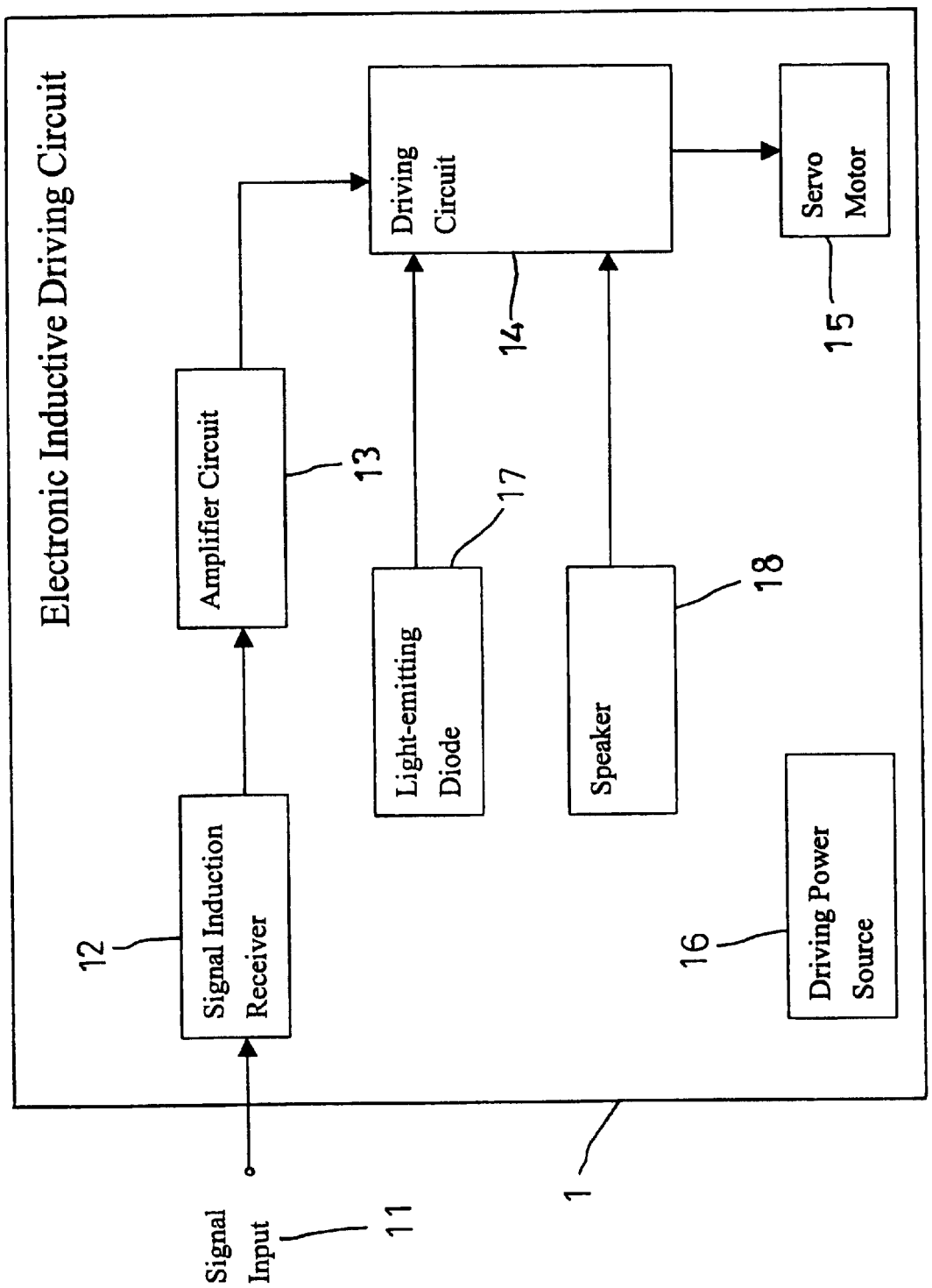
FIG. 1 is a block diagram showing the structure of a conventional electronic inductive driving circuit.
Figure 2:
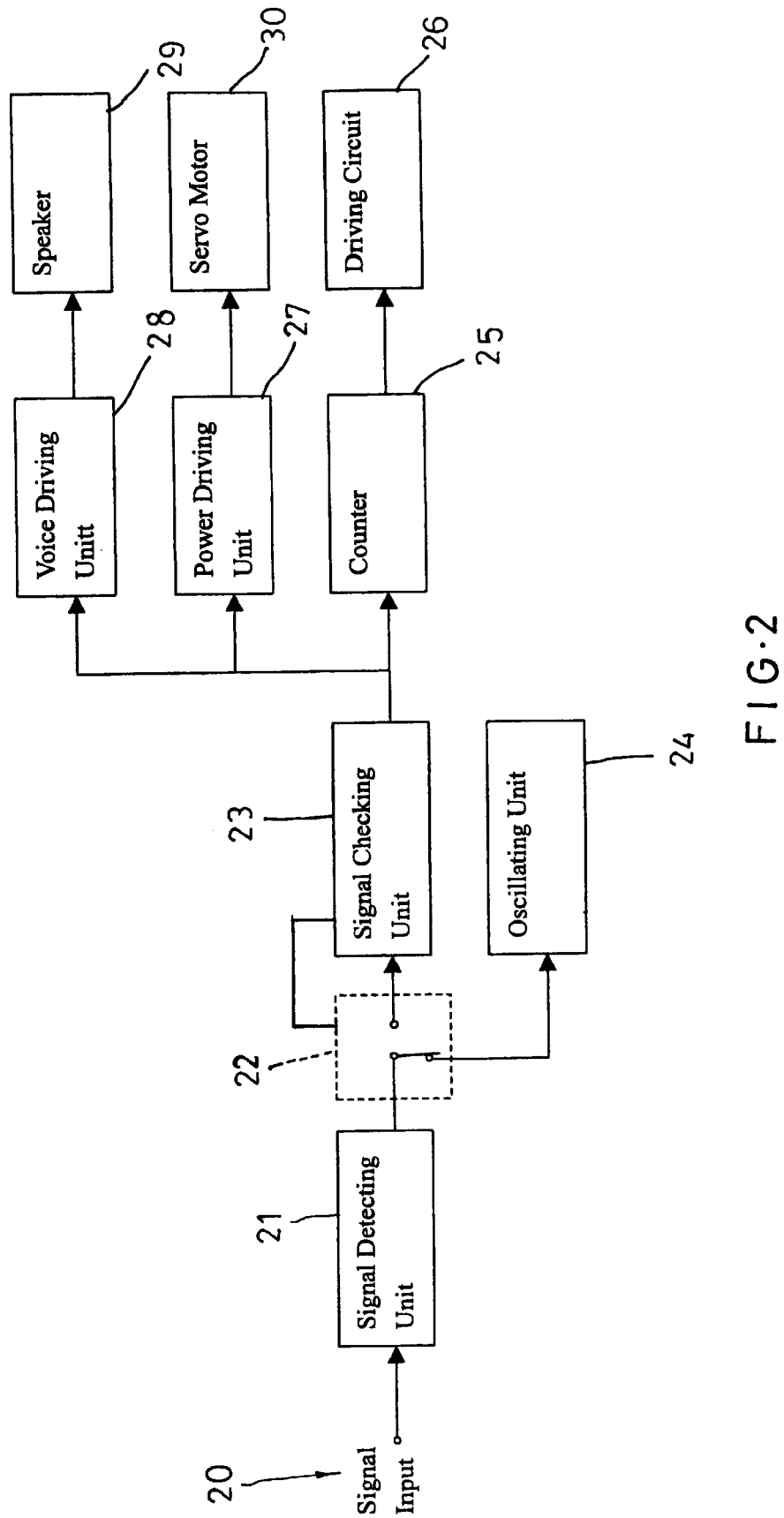
FIG. 2 is a block diagram showing the structure of an embodiment of the present invention.

FIG. 2 is a block diagram of the wave-discriminating inductive electronic device according to an embodiment of the present invention. As shown, there is a signal checking unit 23 being used to check whether a signal input 20 is an electromagnetic-wave signal. The signal input 20 is received by a signal detecting unit 21 that is connected to a switch 22. The switch 22 performs appropriate transmission of signal depending on the signal received by the signal detecting unit 21, and drives the signal checking unit 23 and an oscillating unit 24 both being connected to the switch 22. The signal checking unit 23 is internally set to obtain a predefined sampling signal, which is compared to a data signal output by the signal detecting unit 21 to the signal checking unit 23. When the data signal output by the signal detecting unit 21 is similar to the predefined sampling signal, a counter 25, a power driving unit 27, and a voice driving unit 28 separately connected to the signal checking unit 23 are actuated. The counter 25 is connected to a driving circuit 26 for the latter to perform appropriate work. The power driving unit 27 drives a servo motor 30 connected thereto, so that the servo motor 30 performs appropriate work, such as to produce vibrations. The voice driving unit 28 also drives a speaker 29 connected thereto, so that the speaker 29 produces appropriate voice or sound.

When the data signal output by the signal detecting unit 21 does not match with the predefined sampling signal, the data signal is sent to the oscillating unit 24 for a frequency oscillatory response process. The processed data signal is then sent to the signal checking unit 23 again for a second time check by comparing it to the predefined sampling signal again. When the processed data signal still does not match with the predefined sampling signal, it is ignored to avoid wrong and unwanted actuation of the present invention when the signal input is a noise. After the signal input 20 is received by the signal detecting unit 21 and passes a feedback control performed by the signal detecting unit 21 and the signal checking unit 23, the switch 22 performs appropriate actuation, so that the signal input is transmitted to other appropriate units for appropriate process. The signal checking unit 23 in the above-described circuit constitutes a core of the entire device of the present invention to discriminate whether a signal input is a signal needed by the system of the present invention. When a signal input is determined as an accepted signal, all the related action elements connected to the circuit are enabled to execute different acts, such as flashing and counting on an LED, producing voices or sounds, running a motor, producing vibrations, etc. And, when the signal input is determined as an unaccepted signal, the oscillating unit is immediately stopped and all units for flashing and counting on the LED, producing voices and sounds, running the motor, etc. are immediately disabled. That is, the device of the present invention is adapted to perform immediate detection of signal and to immediately enable various mechanisms, such as LED, voice unit, motor, etc., such that when the signal is removed, these mechanisms could be immediately disabled, and when a new signal is detected, these mechanisms could be immediately enabled. With these arrangements, an interesting and entertaining effect could be created.

Figure 3:
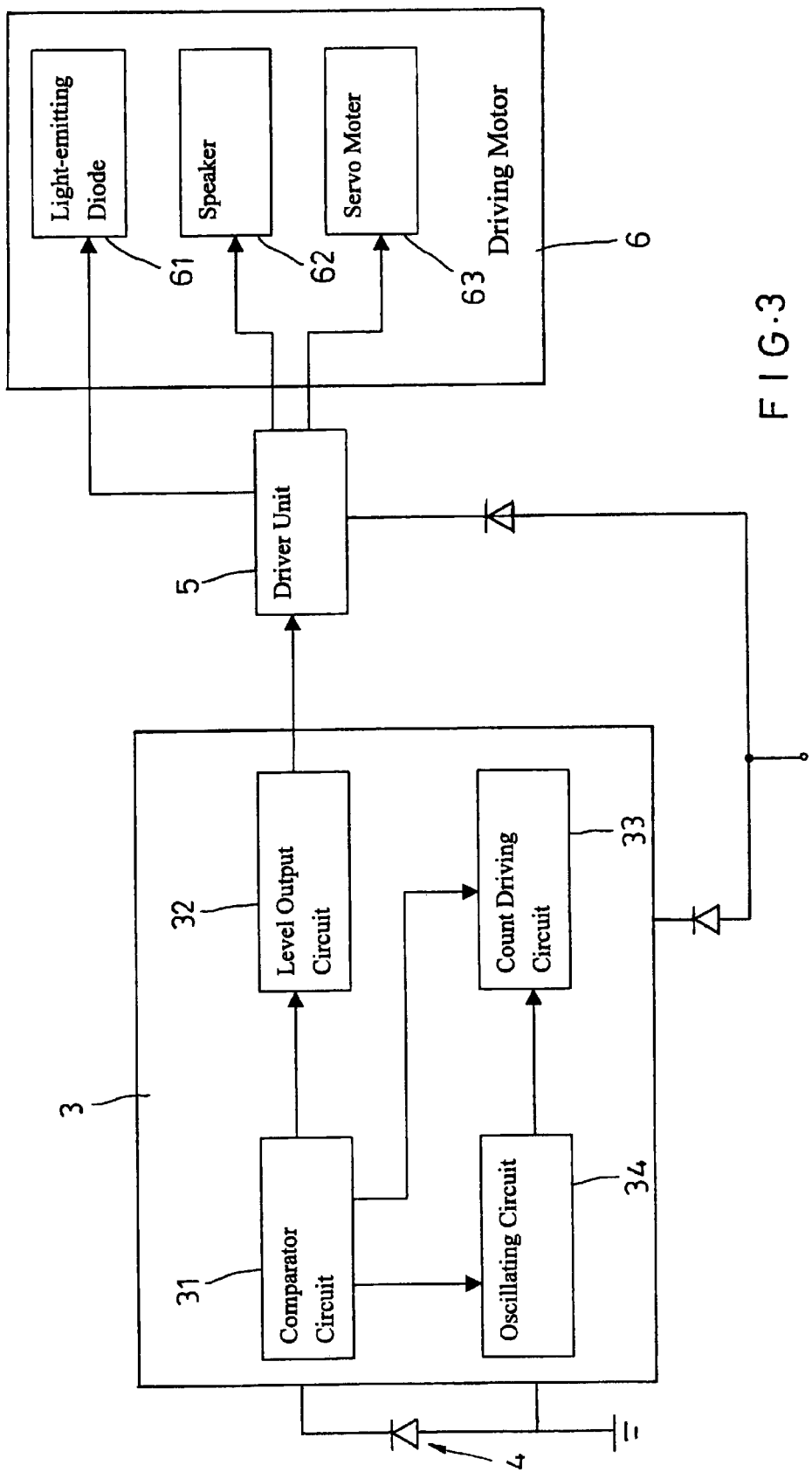
FIG. 3 is a block diagram showing the working manner of the circuit of the embodiment of FIG. 2.

Please now refer to FIG. 3 that is a block diagram showing the working manner of the circuit of the above-mentioned embodiment of the present invention. As shown, there is a detector diode 4 connected to an integrated circuit 3. The integrated circuit 3 includes a comparator circuit 31, a level output circuit 32, a count driving circuit 33, and an oscillating circuit 34. The comparator circuit 31 is configured to perform signal comparison and output any result from the comparison to the level output circuit 32, the count driving circuit 33 and the oscillating circuit 34. When the oscillating circuit 34 receives the signal sent by the comparator circuit 31, it performs an oscillatory process and outputs an oscillating signal to the count driving circuit 33. Based on the signal received from the comparator circuit 31, the count driving circuit 33 executes counting and feeds back any result to the comparator circuit 31 for a reference process. The level output circuit 32 receives the signal processed and output by the comparator circuit 31 and outputs a signal to an external driver 5 for the latter to drive a driving unit 6 connected thereto. The driving unit 6 includes driving elements, such as a plurality of light-emitting diodes 61, a plurality of speakers 62, and a plurality of servo motors 63. When the driving elements in the driving unit 6 respond corresponding to the driver 5, a desired entertaining effect is achieved.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A wave-discriminating inductive electronic device, comprising:

a signal checking unit for detecting an electromagnetic wave, a signal detecting unit connected to a switch, and an oscillating unit that is connected to said signal detecting unit via said switch and is also connected to said signal checking unit;

said oscillating unit processing a signal received and feeding back an output signal to said signal checking unit for a signal comparison process; and said signal checking unit being connected to a counter, a power driving unit, and a voice driving unit that execute appropriate works in response to said signal checking unit.

2. The wave-discriminating inductive electronic device as claimed in claim 1, wherein said switch receives signals separately sent by said signal detecting unit and said signal checking unit to perform appropriate controls.

3. The wave-discriminating inductive electronic device as claimed in claim 1, wherein said signal checking unit is internally set to provide a predefined sampling signal, which is compared to a signal received by said signal checking unit so as to determine whether said received signal is an active signal to said device.

4. The wave-discriminating inductive electronic device as claimed in claim 3, wherein said signal checking unit receives a signal transmitted by said signal detecting unit and appropriately amplifies said signal fed back by said oscillating unit connected to said signal checking unit, and compares said predefined sampling signal to said signal received from said signal detecting unit or said signal fed back by said oscillating unit.

5. The wave-discriminating inductive electronic device as claimed in claim 1, wherein said counter is connected to a driving circuit that appropriately acts in response to said counter; said power driving unit being connected to a servo motor to generate vibrations and rotations; and said voice driving unit being connected to a speaker to produce voices and sounds.

6. A wave-discriminating inductive electronic device for mounting on a mobile phone to create an entertaining effect, comprising:

a detector diode for signal filtering, said detector diode screening out signals that are not needed by said inductive electronic device and outputting an accepted signal;

an integrated circuit for receiving said signal output by said detector diode, comparing an internally set sampling signal to said received signal, and outputting an appropriate driving signal;

an external driver for receiving said driving signal output by said integrated circuit and thereby driving various driving elements of a driving unit connected to said driver; and said driving unit receiving driving signals sent by said driver to generate appropriate actions in response to said received driving signals.

wherein said integrated circuit comprises a comparator circuit, a level output circuit, a count driving circuit, and an oscillating circuit; said comparator circuit being connected to said level output circuit, said count driving circuit, and said oscillating circuit;

said oscillating circuit receiving a signal output by said comparator circuit and performing an oscillatory process to said received signal, and outputting said processed signal to said count driving circuit; said count driving circuit receiving said signal output by said oscillating circuit, and said signal received by said count driving circuit from said oscillating circuit and a signal received by said count driving circuit from said comparator circuit being counted and fed back by said count driving circuit to said comparator circuit for signal comparison; and said comparator circuit outputting a processed resultant signal to said level output circuit for the latter to output a driving signal to said driver.

7. The wave-discriminating inductive electronic device as claimed in claim 6, wherein said driving unit comprises a plurality of light-emitting diodes, a plurality of speakers, and a plurality of servo motors, and said light-emitting diodes, said speakers and said servo motors appropriately emitting flashes, producing voices or sounds, and generating vibration and rotation, respectively, in response to signals sent by said driver.

* * * * *